(12) United States Patent
Ross et al.

(10) Patent No.: US 7,740,396 B2
(45) Date of Patent: Jun. 22, 2010

(54) ARRANGEMENT FOR IMPROVING THE OPERATIONAL PERFORMANCE OF CEMENT MIXING TRUCK

(75) Inventors: Charles E. Ross, Nova, OH (US); William P. Amato, Avon, OH (US); Michael D. Tober, Bay Village, OH (US); Timothy J. Frashure, Columbia Station, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1065 days.

(21) Appl. No.: 11/410,765

(22) Filed: Apr. 25, 2006

(65) Prior Publication Data

US 2007/0247964 A1    Oct. 25, 2007

(51) Int. Cl.
*B28C 7/02* (2006.01)
(52) U.S. Cl. ............... 366/2; 366/6; 366/60; 366/61
(58) Field of Classification Search ............ 366/2, 366/6, 44, 60, 61; 280/5.51
See application file for complete search history.

(56) References Cited

U.S. PATENT DOCUMENTS

| | | | |
|---|---|---|---|
| 4,585,356 A | 4/1986 | Hudelmaier | |
| 4,976,330 A * | 12/1990 | Matsumoto | 180/197 |
| 5,032,821 A | 7/1991 | Domanico | |
| 5,752,768 A | 5/1998 | Assh | |
| 6,938,716 B1 | 9/2005 | Eull | |
| 2001/0007962 A1 * | 7/2001 | Griessbach | 701/36 |
| 2002/0095244 A1 * | 7/2002 | Rhode et al. | 701/1 |
| 2002/0149161 A1 * | 10/2002 | Smith | 280/5.507 |

FOREIGN PATENT DOCUMENTS

| | | |
|---|---|---|
| JP | 1235504 | 9/1989 |
| SU | 1405994 | 6/1988 |

OTHER PUBLICATIONS

International Search Report and Written Opinion from PCT/US2007/004093, mailed Aug. 7, 2007.
Bendix Commercial Vehicle Systems LLC, Bendix® ABS-6 Advanced ESP® Stability System Sales Sheet, Mar. 2005.
Bendix Commercial Vehicle Systems LLC, Bendix® ABS-6 Advanced with ESP® Stability System Frequently Asked Questions, Mar. 2005.

* cited by examiner

*Primary Examiner*—David L Sorkin
(74) *Attorney, Agent, or Firm*—Eugene E. Clair; Cheryl L. Greenly

(57) ABSTRACT

A system and method are provided for improving the operational performance of a moving cement mixer vehicle with a rotatable mixing drum by automatically stopping the rotation of the mixing drum at select moments. The system may include a sensor adapted to deliver a signal indicative of an operational parameter, such as steering angle of the vehicle, and a processing unit adapted to receive the signal from the sensor and deliver a control signal based on the signal for stopping rotation of the mixing drum.

12 Claims, 3 Drawing Sheets

ARRANGEMENT FOR IMPROVING THE OPERATIONAL PERFORMANCE OF CEMENT MIXING TRUCK

BACKGROUND OF THE INVENTION

Cement mixer trucks are used to transport loads of mixed, non-hardened cement. These trucks typically have a rotatable mixing drum for storing the cement mixture and a hydraulic system and mixing drum controller for controlling the rotation of the drum. The agitation caused by rotating the mixing drum prevents the cement mixture from setting up and hardening. Therefore, the mixing drum is typically rotating both when the truck is moving and when the truck is stopped.

As a result of the mixing drum rotating, the position of the cement mixture in the drum is generally shifted in the direction of rotation, both laterally and upward along the inside of the drum. This shift of the cement load results in a shift of the center of gravity of the truck, which makes one side of the vehicle heavier that the other side. The uneven loading of the vehicle can have a detrimental effect on vehicle performance. For example, when the vehicle is moving, the offset of the center of gravity increases the rollover risk of the vehicle in the direction of the heavier side. Lateral (side) acceleration creates a force at the center of gravity, "pushing" the truck horizontally. The friction between the tires and the road opposes that force. If the lateral force is high enough, one side of the truck may begin to lift off the ground potentially causing the vehicle to roll over. Thus, the height and lateral offset of the center of gravity affect roll stability.

In addition, uneven distribution of weight across the wheels of the vehicle can adversely impact performance of the vehicle in other ways, such as braking and traction control. For example, in an antilock braking system (ABS), an evenly distributed load allows each wheel to more optimally brake. Furthermore, with automatic traction control (ATC) systems, uneven loading may cause a drive wheel to slip.

SUMMARY

The present invention relates generally to cement mixer vehicles. More particularly, the invention relates to an arrangement or system and method for improving the operational performance of a moving cement mixer vehicle with a rotatable mixing drum by automatically stopping the rotation of the drum at select moments. For example, the rotation of the mixing drum may be stopped as a result of one or more trigger events occurring.

In accordance with one aspect of the present invention, an arrangement and method are provided that may reduce the roll-over risk of a moving cement mixer vehicle by stopping rotation of the mixing drum. In one embodiment, the steering angle of the vehicle is sensed and the decision to stop the mixing drum is based, in whole or in part, on the direction and degree of the steering angle. In another embodiment, a future value for an operational parameter is predicted and the mixing drum is stopped when the predicted future value exceeds a threshold value. In a more specific embodiment, the predicted future value of lateral acceleration is based, in part, on determining the steering angle of the vehicle. In another embodiment, a threshold value for an operational parameter is automatically adjusted based on the vehicle steering angle and the rotation of the mixing drum is stopped when a value of the operational parameter exceeds the modified threshold value.

In accordance with another aspect of the present invention, an arrangement and method are provided that may stop rotation of a mixing drum on a cement mixer vehicle when a specific operational event is occurring. In one embodiment, the arrangement may stop rotation of the mixing drum when an anti-lock brake event occurs. In another embodiment, the arrangement may stop rotation of the mixing drum when an automatic traction control system is activated or intervenes. In yet another embodiment, the arrangement may stop rotation of the mixing drum when an automatic vehicle stability system is activated or intervenes.

In accordance with another aspect of the present invention, an arrangement and method are provided that determine the turning direction of the vehicle and utilize the turning direction to determine if the rotation of a mixing drum should be stopped. In one embodiment, the arrangement recognizes that the vehicle is turning and may determine which direction the vehicle is turning. The arrangement may stop rotation of the mixer drum only if stopping the rotation of the mixer drum benefits rollover stability of the vehicle.

These and other aspects and advantages of the present invention will be apparent to those skilled in the art from the following description of the preferred embodiments in view of the accompanying drawings.

BRIEF DESCRIPTION OF THE DRAWINGS

In the accompanying drawing, which are incorporated in and constitute a part of the specification, embodiments of the invention are illustrated, which, together with a general description of the invention given above, and the detailed description given below, serve to exemplify embodiments of the invention.

DETAILED DESCRIPTION

The present invention contemplates a system and a method for improving the operational performance of a moving cement mixer vehicle by automatically stopping the rotation of a mixing drum at select moments, such as for example when one or more trigger events are occurring. By stopping the mixing drum, the present invention may, for example, improve vehicle stability by reducing the risk of rollover, improve the performance of the vehicle's anti-lock brake system, and improve the performance of the vehicle's automatic traction control system. The system may be adapted to sense one or more operational parameters of the vehicle, such as the steering angle, direction of the vehicle, and lateral acceleration. Furthermore, the system may be adapted to determine is a specific event is occurring, such as for example an anti-lock braking event. The system may also be adapted to predict a future value of an operational parameter. Based on the predicted value and/or the occurrence of a specific event, the system may stop the rotation of the mixing drum to improve the vehicle operational performance.

While various aspects and concepts of the invention may be described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Figure 1:
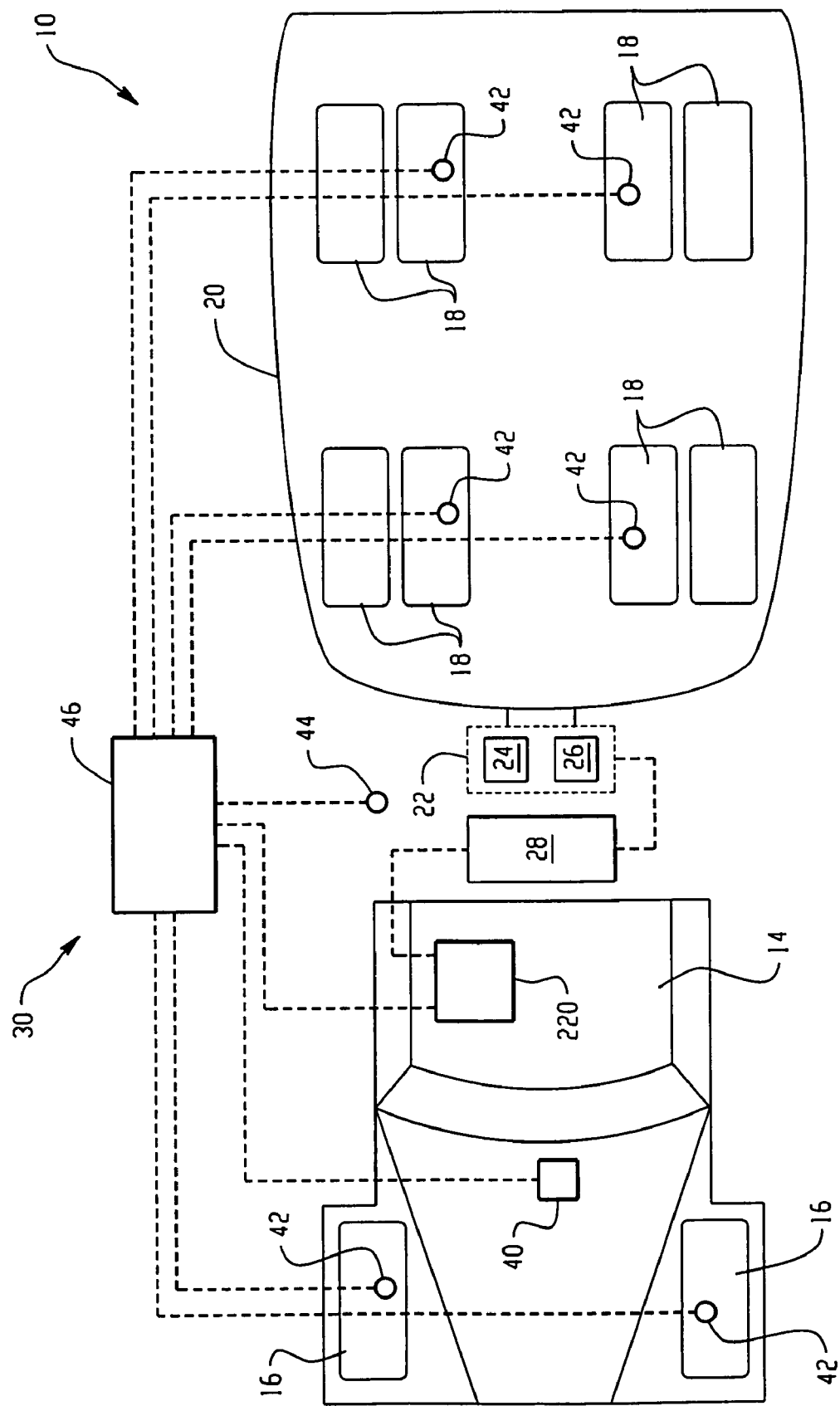
FIG. 1 is a schematic illustration of an exemplary embodiment of a system for stopping rotation of a cement mixing drum according to the present invention.

Referring to FIG. 1, a partial schematic of a cement mixer vehicle 10 is illustrated. The cement mixer vehicle 10 may include cab 14, a set of front wheels 16, a set of rear wheels 18, and a rotatable mixing drum 20 for transporting a load of cement. The cement mixer vehicle 10 may also include a means for rotating the drum 22. In the exemplary embodiment of FIG. 1, the mixing drum rotating means 22 may be realized in the form of a hydraulic system. The hydraulic system 22 may include a drum motor 24 and a hydraulic pump 26 to drive the drum motor 24, as is known in the art. A mixing drum controller 28 may also be provided for communicating with the hydraulic system 22 to start and stop rotation of the drum 20 and control the speed of the rotation. The vehicle 10 may also include a system 30 capable of stopping rotation of the mixing drum 20 at select moments.

Figure 2:
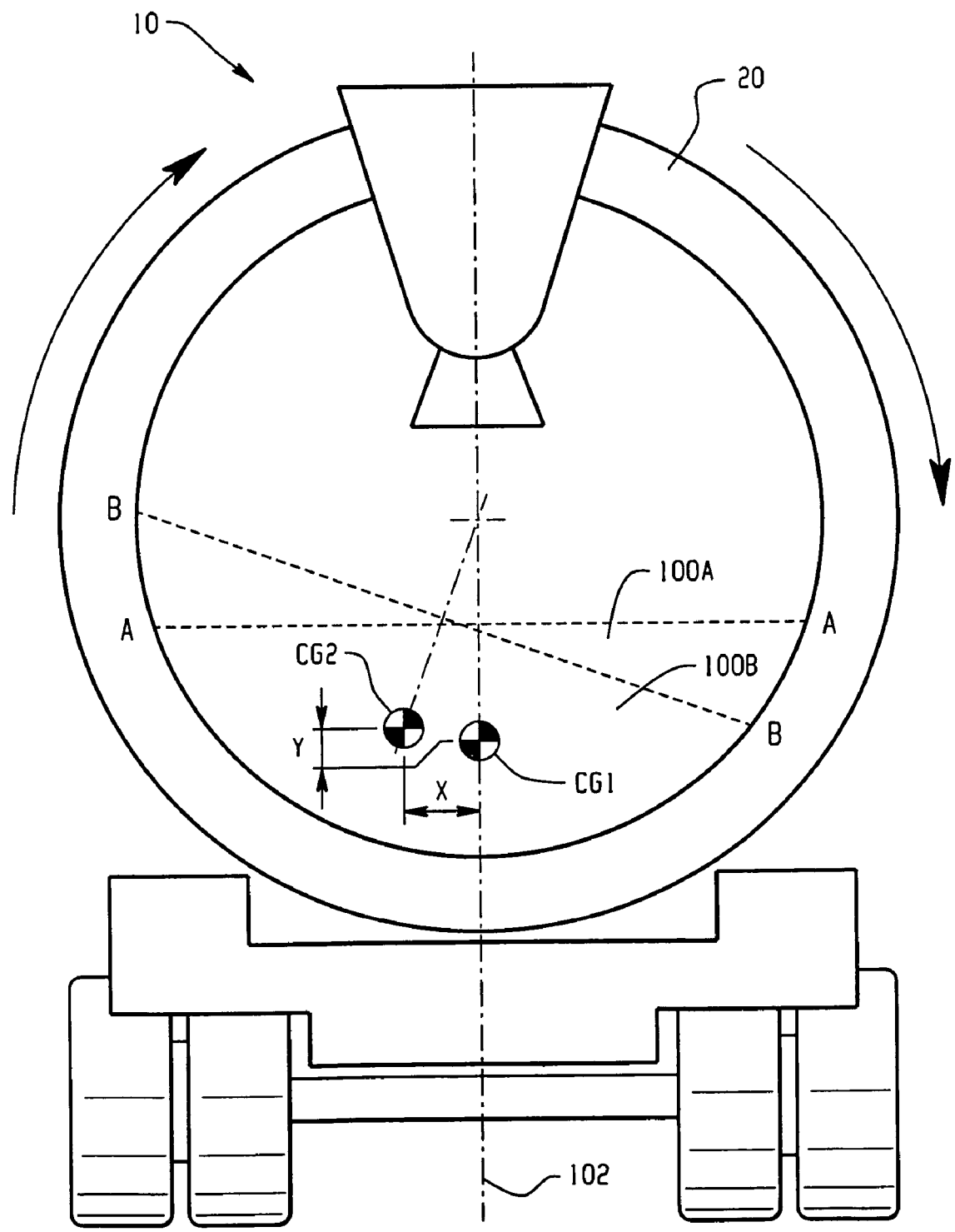
FIG. 2 is a rear schematic illustration of a cement mixer vehicle showing a cement load in a rotating mixing drum shifting in the direction of rotation.

Referring to FIG. 2, a rear schematic illustration of a cement mixer vehicle 10 is presented. When the mixing drum 20 is not rotating, the cement load 100A is at a first position resting in the bottom of the drum, shown by line A-A. The center of gravity CG1 of the resting cement load 100A is generally along a central axis 102. For a cement mixer vehicle 10, when viewed from the rear, the mixing drum 20 conventionally rotates clockwise (as shown by arrows in FIG. 2). When the mixing drum 20 is rotating, the cement load 100B shifts to a second position shown by line B-B. In the second position, the cement load 100B has shifted both laterally in the direction of rotation of the mixing drum 20 and upward as it follows in the inner surface of the drum. When the cement load 100B shifts, the center of gravity CG2 of the cement load shifts a distance X laterally and a distance Y vertically. The amount of shift of the cement load 100B depends on the speed of rotation of the mixing drum 20. The faster the rotation, the more the center of gravity CG2 shifts both laterally and vertically.

Since the mixing drum 20 conventionally rotates clockwise when viewed from the rear of the vehicle, the shift in the center of gravity of the cement load results in the left-hand side of the vehicle 10 being more heavily loaded that the right-hand side, when viewed from the rear. Furthermore, the shift in the center of gravity CG2 makes the vehicle 10 more prone to roll over when making a right-hand turn. Thus, stopping the rotation of the mixing drum 20 results in the cement load 100A returning to a more centered position. In this position, the vehicle 10 is more stable during a right-hand turn than when the drum 20 is rotating. Furthermore, stopping rotation of the mixing drum 20 may also provide a sudden torque in the direction the drum was rotating. The sudden torque acts opposite the lateral forces acting on the vehicle 10 during a right hand turn. Thus, the sudden torque may also help prevent rollover.

In a cement mixer vehicle 10 as described above, stopping rotation of the mixing drum 20 during a left hand turn does not benefit rollover stability. Thus, the system 30 of the present invention, may account for the direction of turn and only stop rotation of the mixing drum when doing so may benefit roll stability. The system 30, however, may be equally applicable to stop rotation of the mixing drum 20 during a left hand turn if desired.

For a vehicle equipped with an antilock braking system, uneven distribution of weight across the wheels of the vehicle can result in one or more wheel bearing a disproportion amount of the braking function. This may result in less than optimal braking performance and higher brake wear on those wheels. Furthermore, uneven loading of the vehicle 10 can cause one or more drive wheels to slip. In a vehicle equipped with an automatic traction control system, the system will intervene to address the wheel slip. By stopping rotation of the mixing drum 20 during an automatic traction control system intervention, the system 30 may aid the traction control system in improving traction performance. If, however, a drive wheel on the more heavily loaded side of the vehicle 10 is slipping, then the system 30 will not stop the rotation of the mixing drum 20 since this would not aid traction control.

Referring to FIG. 1, a system 30 is provided which is capable of stopping rotation of the mixing drum 20 at select moments. The system 30 may include one or more sensors for providing a signal indicative of an operating parameter or condition of the vehicle 10. A variety of sensors may be employed. In the exemplary embodiment of FIG. 1, the system 30 may include, but is not limited to, a steering angle sensor 40, one or more wheel speed sensors 42, and a combination lateral acceleration and yaw rate sensor 44. Alternatively, separate sensors may be used for lateral acceleration and yaw rate. The steering angle sensor 40 may be adapted to provide a signal indicative of the direction of turn a vehicle (left-hand turn vs. right-hand turn) as well as the angle of the turn. The system 30 may also utilize additional sensors not described in the exemplary embodiment.

The system 30 may also include a processing unit 46 in communication with the one or more sensors. The processing unit 46 may be adapted to receive input data from the sensors, process the input data, compare the input data to a threshold value, and deliver a control signal based on the comparison. The sensors and processing unit 46 may be part of a preexisting system or use components of a preexisting system. For example, the Bendix® ABS-6 with Electronic Stability Program (ESP)® available from Bendix Commercial Vehicle Systems, LLC may be installed on the vehicle 10. The Bendix ESP system may utilize some or all of the sensors described in FIG. 1, such as for example, the steering angle sensor 40, the wheel speed sensors 42, the combination lateral acceleration and yaw rate sensor 44. The logic component of the Bendix ESP system resides on the vehicle's antilock brake system electronic control unit, which may be used for the processing unit 46 of the present invention. Therefore, many of the components to support the system 30 of the present invention may be present in a vehicle equipped with the Bendix ESP system, thus, not requiring the installation of additional components. The system 30, however, may utilize independently installed components if desired.

Figure 3:
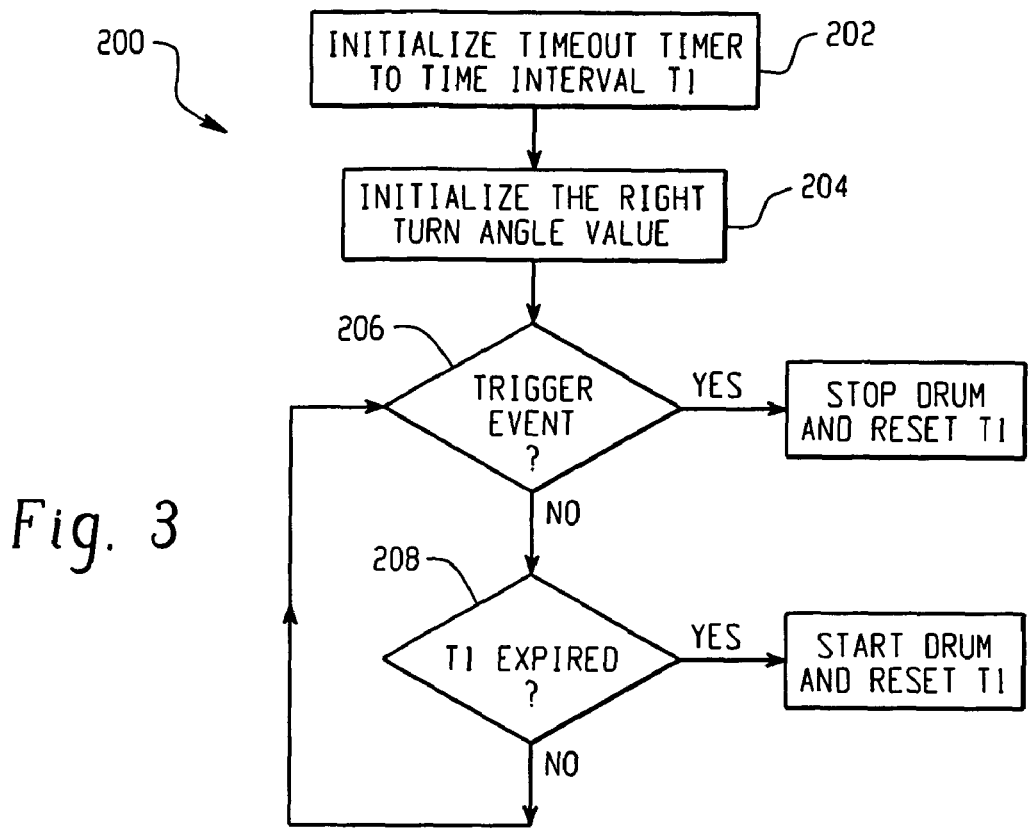
FIG. 3 is a flow diagram of an exemplary embodiment of a method for stopping rotation of a cement mixing drum according to the present invention.

FIG. 3 illustrates a flow diagram of an exemplary embodiment of a method 200 for stopping the rotation of a cement mixer drum 20 at select moments. The method 200 may include the step of initializing a timeout timer 202. The timeout timer is designed to provide a time interval T1 that must elapse before resuming rotation of the mixing drum 20. The time interval T1 may be selected at the discretion of the user, such as for example, a time in the range of about four to about ten seconds. Once the timeout timer has been initialized, it may count down to zero unless reset.

The method 200 may also include the step of initializing a right turn angle value 204. The right turn angle value may act as a threshold value that when exceeded acts as a trigger event for the system 30 to intervene and stop rotation of the mixing drum 20. The right turn angle value may be selected at the discretion of the user, such as for example, an angle in the range of about 10 degrees to about 20 degrees. The steps of initializing the timeout timer and initializing the right turn angle value may be performed during the initial performance of the method 200 and not need to be re-initialized in subsequent performances of the method.

The method 200 may include the step of checking if one or more trigger events are occurring 206. If the one or more trigger events are occurring, the mixing drum may be stopped and the timeout timer may be reset to the time interval T1. The method 200 may also include the step of checking if the timeout timer has expired 208. If the timeout timer has expired, then rotation of the mixing drum may be restarted and the timeout timer may be reset to the time interval T1. The step of checking if the one or more trigger events are occurring 206 and the step of checking if the timeout timer has expired 208 may then be repeated as desired, such as for example the steps may be continuously repeated while the cement mixer vehicle is operating.

In operation, the method 200 may check if the one or more trigger events are occurring. If the one or more trigger events are occurring, then the mixing drum 20 may be stopped and the timeout timer may be reset to the time interval T1. The method 200 may then check if the timeout timer has expired. If the timeout timer has not expired, such as in the case where the timer was recently reset, then the method 200 may recheck if the one or more trigger events are occurring. If they are still occurring, then the mixing drum 20 remains stopped and the timeout timer may once again reset. This loop between step 206 and step 208 may continue in this manner until the one or more trigger events are not occurring and the timeout timer has expired. If both of those conditions have been satisfied, then the mixing drum 20 may begin rotating again. Thus, the time interval T1 may provide a delay before the drum 20 is restarted.

The trigger events which may result in the mixing drum 20 being stopped may be based on a variety of operational conditions, events, or parameters of the vehicle 10. For example, in the method 200, the steering angle of the vehicle exceeding the right turn value may be used as a trigger event. In other embodiments, however, other or additional trigger events may be used. For example, a trigger event may be defined as an operational event occurring on the vehicle, such as for example an anti-lock braking event, an intervention by an automatic traction control system, or an intervention by an electronic stability control system. The trigger event may be based on a single operational event occurring or multiple events occurring.

Using the steering angle and the turning direction of the vehicle as trigger events may be beneficial, though not required, because steering angle and steering direction are an early indicator of a potentially critical maneuver. Thus, this information helps the system 30 respond quickly to a potential rollover.

In particular, the system 30 may utilize the steering angle sensor 40 to detect the initial change in vehicle direction from the driver's steering input. The system 30 may then predict the future lateral force that will result from the change in direction. A predicted value for the lateral force may be determined from the steering angle and vehicle speed, as is known in the art. As a vehicle 10 proceeds through a maneuver, the actual vehicle lateral acceleration progressively increases up to a predetermined threshold. If the system 30 senses the curve becoming tighter due to the input from the steering angle sensor 40, the system may automatically send a trigger signal to stop rotation of the mixing drum 20 before the critical threshold for lateral acceleration is exceeded.

In another embodiment, the threshold value for vehicle lateral acceleration may be automatically adjusted based on the steering angle of the vehicle. For example, when the vehicle is traveling in a straight path, the steering angle may be zero and the threshold value for lateral acceleration may be at its greatest value. As the driver turns the steering wheel, the steering angle begins to increase. As the steering angle increases, the lateral acceleration threshold value may automatically decreased by the system 30 such that the actual or predicted lateral acceleration exceeds the threshold value earlier and a triggering event occurs.

Early detection with the steering angle sensor 40, and correlation of the initial indication of lateral acceleration from the lateral acceleration sensor 44, enable the system 30 to react quicker than a system the measures and reacts to lateral acceleration alone. For example, in a vehicle without a steering angle sensor 40 up to one second delay or more may exist to ensure that the lateral acceleration is not caused by a "bump in the road" or other false event. In the present invention, however, the system 30 may be adapted to identify a rollover risk earlier by using the steer angle sensor 40 and other inputs to calculate the lateral forces before they actually occur and initiate a trigger signal based on the predicted future lateral acceleration.

Figure 4:
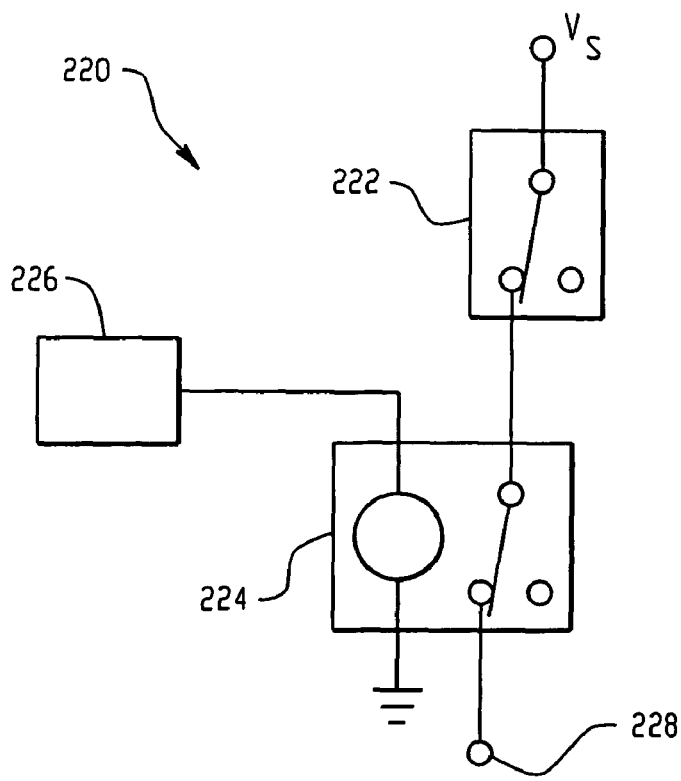
FIG. 4 is a schematic of a exemplary embodiment of a circuit of the system of FIG. 1.

Stopping rotation of the mixing drum 20 may be accomplished in a variety of ways. FIG. 4 is a schematic representation of an example of a circuit 220 for stopping the rotation of the mixing drum 20. The circuit 220 may include a switch 222 in circuit communication with a voltage source $V_s$. The voltage source $V_s$ may be, for example, a vehicle battery. The circuit 220 may also include a relay device 224 in circuit communication with the switch 222 and a source for generating a trigger signal 226. The source for generating a trigger signal may be, for example, the processing unit 46 or some other suitable device.

The switch 222 may have a first position and second position. In the first position, the switch 222 routes voltage from voltage source $V_s$ through the relay device 224 to an input 228 on the drum controller 28. The mixing drum controller 28 may be adapted to cause the mixing drum 20 to rotate upon receiving the voltage from the voltage source $V_s$. In the second position, the switch 222 discontinues routing voltage to the input 228 on the mixing drum controller 28. Thus, when the switch 222 is in the second position, the mixing drum 20 is not rotating.

The relay device 224 may also have a first position and a second position. In the first position, the relay device 224 allows the voltage from the voltage source $V_s$ to be delivered to the input 228 on the mixing drum controller 28 (FIG. 1). Thus, when the switch 222 and the relay device 224 are both in the first position, the mixing drum controller 28 causes the mixing drum 20 to rotate. In the second position, the relay device 224 discontinues delivering voltage to the input 228 on the mixing drum controller 28. Thus, when the relay device 224 is in the second position, the mixing drum 20 is not rotating.

The switch 222 may be, for example, a manual toggle switch located in the cab 14 of the vehicle 10. A driver may manually move the switch 22 between the first position and second position to start and stop the mixing drum 20 from rotating. The relay device 224 may move between its first position and its second position in response to a signal generated by the processor 226. The signal generated by the processor 226 to switch the relay device 224 to the second position may coincide with the one or more trigger events occurring, as discussed in relation to the step 206 of the method 200. Thus, when the one or more trigger events occur, the processor 226 sends a signal to switch the relay device 224 to its second position.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A method for improving the operational performance of a moving cement mixer vehicle having a rotating mixing drum, the method comprising the steps of:
   receiving input data indicative of a steering angle;
   comparing the input data to a steering angle threshold value;
   determining if the input data indicative of a steering angle of the vehicle exceeds the steering angle threshold value;
   receiving input data indicative of at least one of a lateral acceleration and vehicle speed;
   automatically adjusting at least one of a lateral acceleration and vehicle speed threshold value based on the input data indicative of the steering angle exceeding the steering angle threshold value;
   comparing the input data indicative of at least one of the lateral acceleration and vehicle speed to at least one of the adjusted lateral acceleration and vehicle speed threshold value; wherein one or more trigger events corresponds to the input data indicative of the at least one of the lateral acceleration and vehicle speed exceeding at least one of the adjusted threshold value for the lateral acceleration and vehicle speed input data; and
   supplying a control signal for automatically stopping rotation of the mixing drum when the one or more trigger events are occurring.

2. The method of claim 1 wherein the step of supplying a control signal for automatically stopping rotation of the mixing drum further comprises: delivering the control signal to a mixing drum controller; and communicating with a hydraulic system.

3. The method of claim 2 further comprising the step of: diverting hydraulic fluid away from a mixing drum hydraulic motor in response to the control signal.

4. The method of claim 1 further comprising the steps of:
   determining if the one or more trigger events are not occurring; and
   supplying a control signal for automatically starting rotation of the mixing drum when the one or more trigger events have not occurred for a predetermined amount of time.

5. The method of claim 4 wherein the predetermined amount of time is in the range of about 4 seconds to about 10 seconds.

6. The method of claim 1 further comprising the steps of:
   determining a turning direction of the vehicle; and
   comparing the turning direction of the vehicle to a predetermined turning direction in which stopping the rotation of the mixing drum benefits rollover stability of the vehicle, wherein the step of supplying a control signal for automatically stopping rotation of the mixing drum is dependent on the determined turning direction of the vehicle matching the predetermined turning direction.

7. The method of claim 1 wherein the steering angle threshold value is in the range of about 10 degrees to about 20 degrees.

8. The method of claim 1 further comprising the steps of:
   predicting a future value for the input data indicative of at least one of the lateral acceleration and vehicle speed based on the steering angle of the vehicle; and
   comparing the predicted future value for the input data indicative of at least one of the lateral acceleration and vehicle speed to at least one of a lateral acceleration and vehicle speed threshold value, wherein one of the one or more trigger events corresponds to the predicted future value exceeding at least one of the lateral acceleration and vehicle speed threshold value.

9. A method for improving the operational performance of a moving cement mixer vehicle having a rotating mixing drum, the method comprising the steps of:
   determining that at least one trigger event is occurring on the vehicle, wherein the at least one trigger event includes at least one of: an anti-lock braking event, an intervention by an automatic traction control system, and intervention by an electronic stability control system; and
   receiving input data indicative of a steering angle;
   receiving input data indicative of at least one of a lateral acceleration and vehicle speed;
   automatically adjusting at least one of a lateral acceleration and vehicle speed threshold value based on the input data indicative of the steering angle;
   comparing the input data indicative of the at least one of the lateral acceleration and vehicle speed to at least one of the adjusted lateral acceleration and vehicle speed threshold value; and
   supplying a control signal for automatically stopping rotation of the mixing drum if the at least one trigger event is occurring and the input data indicative of at least one of the lateral acceleration and vehicle speed exceeds at least one of the adjusted lateral acceleration and vehicle speed threshold value.

10. The method of claim 9 wherein the step of supplying a control signal for automatically stopping rotation of the mixing drum further comprises the steps of:
    sending the control signal to a mixing drum controller; and
    diverting hydraulic fluid away from a mixing drum hydraulic motor.

11. The method of claim 9 further comprising the steps of:
    determining if the one or more trigger events are not occurring; and
    supplying a control signal for automatically starting rotation of the mixing drum when the one or more trigger events are not occurring for a predetermined amount of time.

12. The method of claim 11 wherein the predetermined amount of time is in the range of about 4 seconds to about 10 seconds.

* * * * *